UNITED STATES PATENT OFFICE.

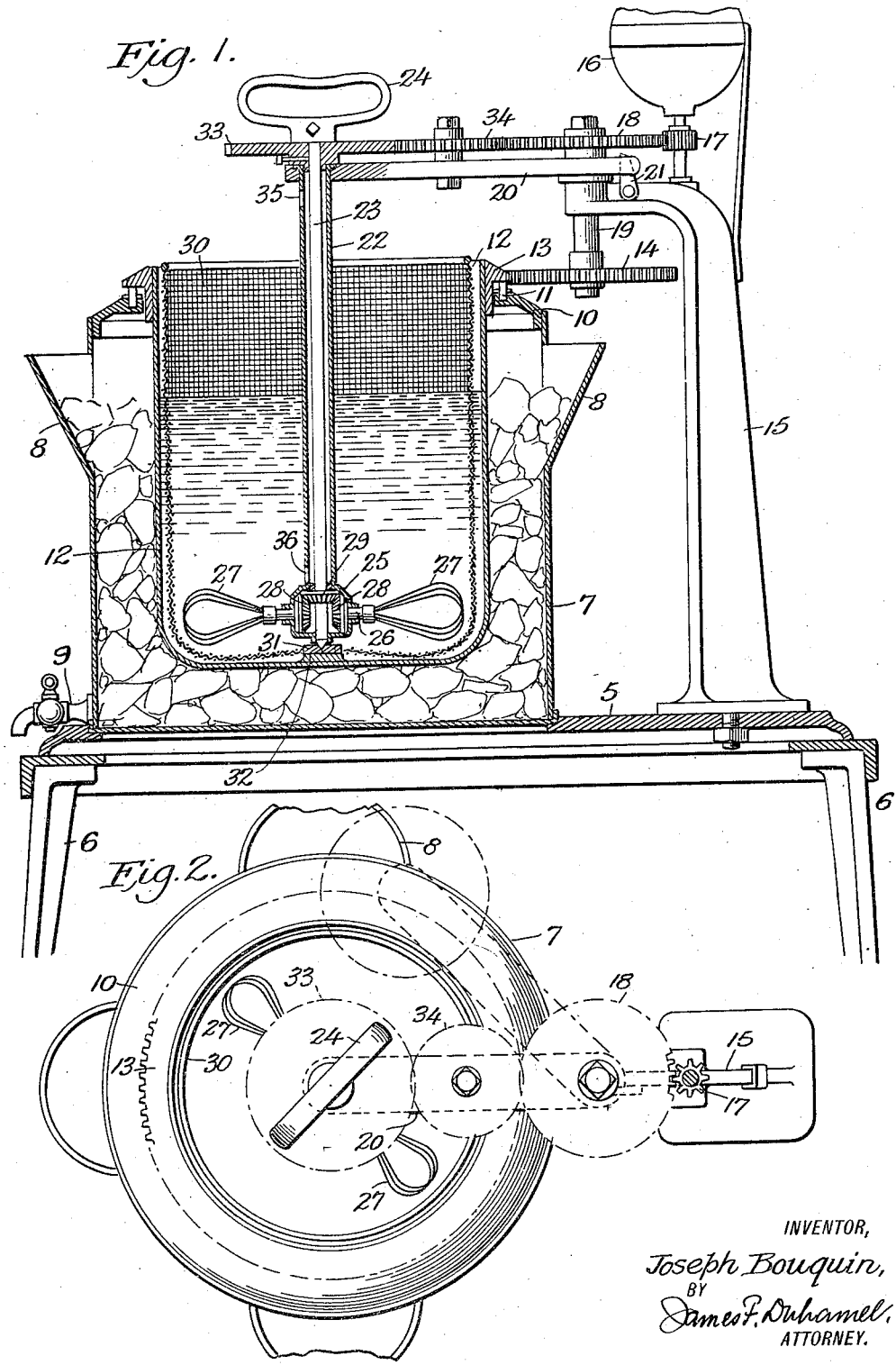

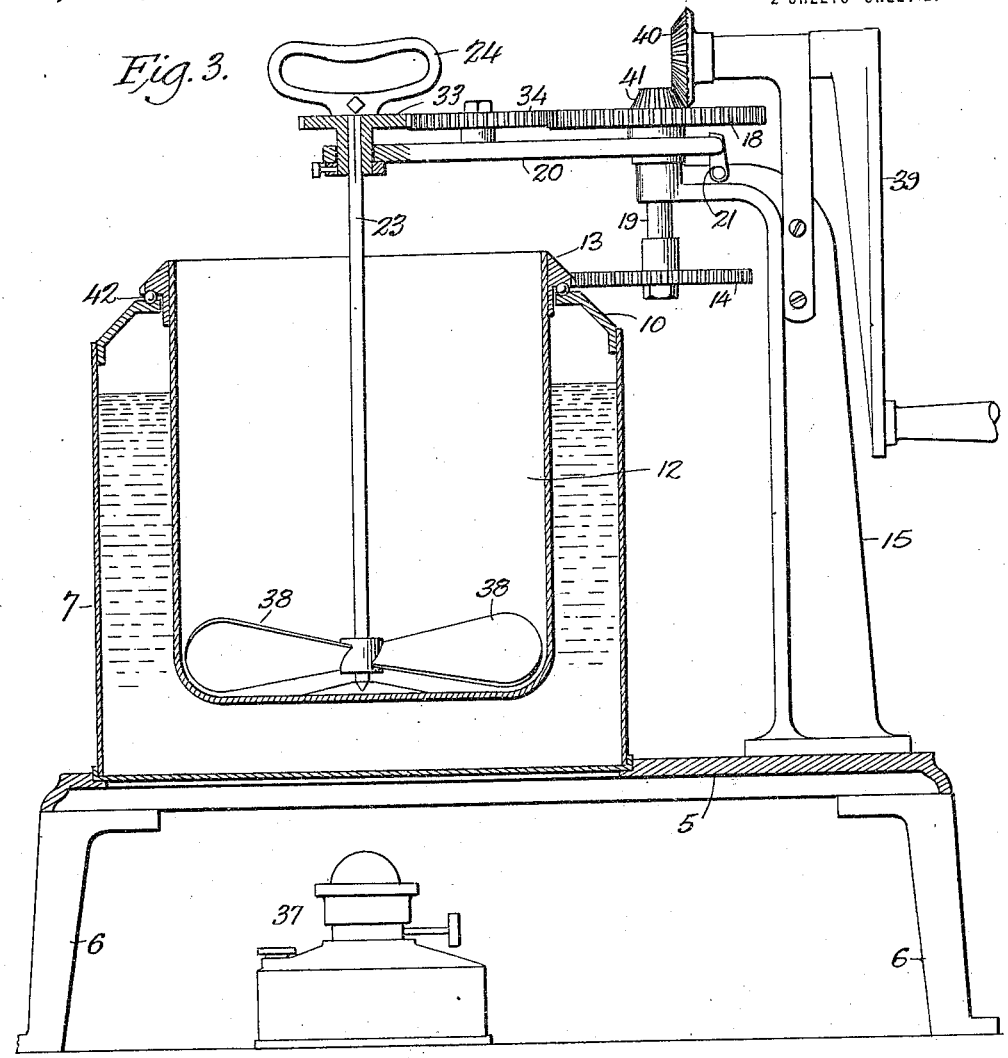

JOSEPH BOUQUIN, OF NEW YORK, N. Y.

MIXER AND BEATER.

1,295,684.  Specification of Letters Patent.  Patented Feb. 25, 1919.

Application filed November 24, 1917. Serial No. 203,683.

*To all whom it may concern:*

Be it known that I, JOSEPH BOUQUIN, a citizen of the United States, and resident of New York, in the county of New York and State of New York, have invented certain new and useful Improvements in Mixers and Beaters, of which the following is a specification.

This invention relates to mixers and beaters for culinary purposes and its object is to whip, beat or mix articles of food and at the same time to subject them to abnormal temperature and to rotate the container while the beaters revolve in an opposite direction, as will be more fully described in the following specification, set forth in the claims appended hereto and illustrated in the accompanying drawings, wherein:

Figure 1 is a vertical sectional view of a device adapted to whip cream in quantities.

Fig. 2 is a plan view of the same.

Fig. 3 is a vertical sectional view of the invention adapted for use as a dressing mixer.

The cream whipper shown in Figs. 1 and 2 is mounted on the base 5 which may be supported on legs 6 or arranged as otherwise desired and on the upper side of the base is a depression to receive the tank 7 adapted in this instance to contain ice and having spouts 8 for the insertion of crushed ice and a cock 9 to drain the water from the tank. On the upper end of the tank is a ring 10 carrying rollers 11 that support a pan 12 also having a ring 13 around its outer edge to rest upon the rollers 11 so that it may revolve in the tank. The ring 13 is toothed to mesh with a gear wheel 14 journaled in the upper end of the upright 15 and the latter supports a motor 16 whose driving pinion 17 turns the gear wheel 18 on the shaft 19 of the wheel 14.

At the pivot of the shaft 19 is supported a bar 20 projecting horizontally and locked in its operative position by the detent 21 pivoted to the upright but which releases the bar when it is desired to swing the same away from the pan, as shown by dotted lines in Fig. 2. The bar 20 carries at its outer end a pipe 22 in which plays a shaft 23 having a handle 24 to raise the same with the pipe when it is desired to elevate these parts and the lower end of the pipe is a housing 25 in which is journaled the shafts 26 of the beaters 27 and at whose inner ends are the beveled gear wheels 28 which mesh with and are driven by the similar wheel 29 at the lower end of the shaft or spindle 23.

Within the pan 12 is a basket 30 carrying in its bottom the bearing block 31 and which rests upon a similar block 32 in the pan, and in the block 31 the pivotal end of the spindle 23 is located while the beaters or whippers are operated by means of the gear wheel 33 at the upper end of the spindle and the interposed gear wheel 34 meshes with the wheel 18.

The operation of the device consists of filling the pan 12 to the desired height with cream and starting the motor which drives the gearing 33 and 34 and rotates the spindle 23 and revolves the beaters 27. The movement of the spindle and the beveled gears tends to also turn the beaters and the pipe 22 around the shaft and to pass through the cream at the bottom of the pan while they revolve. The beaters are also rotated in a reversed direction from the pan by means of the gearing referred to and the pan floats in the ice pack.

Air is admitted to the lower part of the pan and into the cream through the openings 35 and 36 in the pipe 22 and is drawn downward and outward into the cream by the commotion of the beaters. This assists materially in producing the foam constituting the whipped cream and it is obvious that means may be provided for forcing more air down the pipe if desired.

When the operation has been continued until the basket 30 is filled with the whipped cream the spindle 23 and the pipe are lifted upward through the bar 20 until the beaters can clear the top of the pan and basket when the detent 21 is released and the bar swung around so that there is no obstruction to the removal of the basket with the product of the machine.

Upon replacing an empty basket, refilling the pan with cream and returning the bar 20 and the beaters to their working position, the operation may be repeated.

When it is desired to reduce certain ingredients to a paste such as dressings and condiments the device is modified as in Fig. 3 and where the tank 7 is almost entirely inclosed and adapted to contain hot or boiling water and under which some heating device 37 is placed. The spindle 23 in this case carries paddles 38 at its lower end and they are in close proximity with the rounded corners of the pan 12 and they are inclined at an angle to break up any lumps in the preparation as they swing around the pan. Speed is not so essential in this operation as that above described so the motor may be dispensed with and a crank arm 39 substituted to drive the gearing similar to that shown in Fig. 1 and already described by means of the beveled gears 40 and 41 and the pan may be mounted on ball bearings 42 and removed after the spindle and paddles are lifted and swung aside.

Heat is very necessary in dressings where oil is used as it liquefies the same to a greater extent and insures a more perfect mixture of the ingredients.

It is obvious that the device may be otherwise modified for making culinary preparations without departing from the essential features above referred to or the scope of the appended claims.

What I claim as new is:

1. A mixer and beater for whipping cream and similar substances consisting of a container, a perforated vessel therein conforming with the shape of the container and vertically removable therefrom, and an agitator mounted to operate within said perforated vessel and vertically removable therefrom.

2. In a mixer and beater, the combination with a tank of a container therein, a perforated container within the same and adapted to be removed vertically, an agitator operating in the containers and vertically removable therefrom, and means for rotating the first container and the agitator.

3. In a mixer and beater, the combination with a stationary tank, of a rotatable container for the tank, gearing at the upper edge of the container, a basket vertically removable from the container, a vertically slidable shaft suspended in the basket, beaters at the lower end of the same, and means for simultaneously rotating the container and the shaft.

4. In a mixer and beater, the combination of a tank for water, a rotatable container therein, a perforated container within the latter and adapted to be removed vertically, a laterally shifting arm, a shaft adapted to slide vertically in the outer end of the arm, and play in the containers, beaters at the lower end of the shaft, and means for simultaneously rotating the first container and the beaters.

Signed at New York, in the county of New York and State of New York this 19 day of November, A. D. 1917.

JOSEPH BOUQUIN.

Copies of this patent may be obtained for five cents each, by addressing the "Commissioner of Patents, Washington, D. C."